(12) United States Patent
Murai et al.

(10) Patent No.: US 8,901,448 B2
(45) Date of Patent: Dec. 2, 2014

(54) ELECTRIC DISCHARGE MACHINE

(75) Inventors: Masao Murai, Yamanashi (JP); Yasuo Arakawa, Yamanashi (JP); Tomoyuki Furuta, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 272 days.

(21) Appl. No.: 13/282,872

(22) Filed: Oct. 27, 2011

(65) Prior Publication Data

US 2012/0228270 A1  Sep. 13, 2012

(30) Foreign Application Priority Data

Mar. 7, 2011  (JP) ................. 2011-048677

(51) Int. Cl.
B23H 1/02 (2006.01)
B23H 7/04 (2006.01)

(52) U.S. Cl.
CPC ............... B23H 1/022 (2013.01); B23H 1/024 (2013.01); *B23H 7/04* (2013.01)
USPC .................... 219/69.13; 219/69.12

(58) Field of Classification Search
CPC .......... B23H 1/024; B23H 1/02; B23H 7/065; B23H 7/14; B23H 7/16; B23H 7/04; B23H 1/022
USPC ...................... 219/69.11, 69.13, 69.18, 69.17
See application file for complete search history.

(56) References Cited

U.S. PATENT DOCUMENTS

| | | | | | |
|---|---|---|---|---|---|
| 3,609,281 | A | * | 9/1971 | Kauffman | 219/69.13 |
| 3,671,705 | A | * | 6/1972 | Raznitsyn et al. | 219/69.13 |
| 3,739,135 | A | * | 6/1973 | Pfau et al. | 219/69.16 |
| 4,242,555 | A | * | 12/1980 | Delpretti | 219/69.17 |
| 4,347,425 | A | * | 8/1982 | Obara | 219/69.13 |
| 4,820,895 | A | * | 4/1989 | Obara | 219/69.13 |
| 5,254,826 | A | | 10/1993 | Kimura et al. | |
| 6,903,297 | B2 | * | 6/2005 | Goto et al. | 219/69.18 |
| 2004/0124189 | A1 | | 7/2004 | Murai et al. | |

(Continued)

FOREIGN PATENT DOCUMENTS

| | | |
|---|---|---|
| CN | 1235077 A | 11/1999 |
| CN | 101016625 A | 8/2007 |

(Continued)

OTHER PUBLICATIONS

Machine translation of Japan Patent Document No. 6-339,815-A, Sep. 2013.*

(Continued)

*Primary Examiner* — Geoffrey S Evans
(74) *Attorney, Agent, or Firm* — Lowe Hauptman & Ham, LLP

(57) ABSTRACT

An electric discharge machine includes a machining power supply for applying a voltage to a machining gap between a machining electrode and its opposite workpiece and detecting a contact between the machining electrode and the workpiece. The machining power supply includes a first power supply circuit whose output voltage is equal to or less than an arc voltage, a second power supply circuit for supplying a pulse current to the machining gap, and a control unit. When the first power supply circuit detects a contact between the machining electrode and the workpiece, the control unit operates to supply a pulse current from the second power supply circuit to the machining gap while the machining electrode and the workpiece are in contact with each other.

18 Claims, 5 Drawing Sheets

(56) References Cited

U.S. PATENT DOCUMENTS

| | | |
|---|---|---|
| 2005/0115929 A1 | 6/2005 | Sakurai et al. |
| 2007/0289949 A1 | 12/2007 | Suzuki et al. |
| 2008/0110865 A1 | 5/2008 | Hashimoto et al. |
| 2008/0203068 A1 | 8/2008 | Ukai et al. |
| 2010/0133237 A1 | 6/2010 | Onodera et al. |

FOREIGN PATENT DOCUMENTS

| | | | |
|---|---|---|---|
| CN | 101045260 A | | 10/2007 |
| CN | 101065209 A | | 10/2007 |
| CN | 101277778 A | | 10/2008 |
| CN | 201211583 Y | | 3/2009 |
| EP | 0451350 A2 | | 10/1991 |
| EP | 1537934 A2 | | 6/2005 |
| JP | 53072290 A | | 6/1978 |
| JP | 6155171 A | | 6/1994 |
| JP | 06-339815 A | * | 12/1994 |
| JP | 7-156019 A | | 6/1995 |
| JP | 08-99222 A | * | 4/1996 |
| JP | 2002036030 A | | 2/2002 |
| JP | 2004-195562 A | | 7/2004 |
| JP | 2004237413 A | | 8/2004 |
| WO | 2007-032114 A1 | | 3/2007 |

OTHER PUBLICATIONS

Machine translation of Japan Patent Document No. 8-99,222-A, Sep. 2013.*
Jameson, "Electric Discharge Machining", Dec. 2001, Society of Manufacturing Engineers, pp. 123-131.*
Office Action corresponding to JP2011-048677, dated Mar. 8, 2012.
Office Action mailed Sep. 17, 2013 corresponds to Chinese patent application No. 2012-100550553.
Extended European Search Report dated Sep. 10, 2013, corresponds to European patent application No. 11186965.7.
Notification to Grant Patent Right mailed Sep. 25, 2014, corresponding to Chinese patent application No. 201210055055.3.

* cited by examiner

ELECTRIC DISCHARGE MACHINE

RELATED APPLICATIONS

The present application is based on, and claims priority from, Japanese Application Number 2011-048677, filed Mar. 7, 2011, the disclosure of which is hereby incorporated by reference herein in its entirety.

BACKGROUND OF THE INVENTION

1. Field of the Invention

The present invention relates to an electric discharge machine (wire-cut electric discharge machine) using a wire electrode as tool electrode or an electric discharge machine (electric discharge machine for die sinking) using an electrode formed in a shape corresponding to the shape of an intended workpiece as tool electrode.

2. Description of the Related Art

When positive and negative electrodes approach each other, arc discharge occurs and thus part of the electrodes melts and scatters. Electric discharging utilizes the property. One of the electrodes is an object to be machined (workpiece) and the other is a machining electrode provided in an electric discharge machine.

In a conventional electric discharge machine having an electric discharging power supply which employs a system called "transistor type", as disclosed in Japanese Patent Application Laid-Open No. 2004-195562 (corresponding to US 2004/0124189 A1), a first power supply having a high output impedance applies a voltage to a machining gap formed by a machining electrode and a workpiece opposite each other, thereby inducing arc discharge. Thereafter, a current pulse is supplied to the machining gap from a second power supply having a low output impedance to generate high-temperature arc, thereby melting and removing the workpiece. After a predetermined OFF time has elapsed, a voltage is applied again by the first power supply. The above operations are repeated thereby to perform machining.

With the electric discharging by the system described above, it is difficult to previously know where discharge occurs in the machining gap or to positively control where the discharge occurs. In general, as electric field intensity is high at a locally-narrow region in the machining gap distance and insulation breakdown easily occurs, a possibility of discharge generation at the part increases. When the discharge occurs and that part is removed, the discharge generating position shifts to a narrower region in the machining gap distance, as a result, the machining gap distance becomes substantially constant as a whole.

However, when a workpiece in the form of a plate is machined by the electric discharging, an electric field intensity becomes high at an edge portion of the workpiece, as shown in FIG. 1, and thus the possibility of discharge generation at the portion increases. A sludge density is also high at the edge, similar to the facing region between the tool electrode and the workpiece, and thus discharge via sludge also easily occurs. Consequently, the discharge occurs not only between the surface of the tool electrode and that part of the surface of the workpiece which directly faces the tool electrode, but also at the edge of the top or bottom surface of the workpiece, as shown in FIG. 2, and thus a failure such as crack easily occurs.

For a press die to be machined, its edge is important for cutting blade, and failures such as a decrease in dimension accuracy and machining defect of the edge directly influence the accuracy or quality of the press machining and thus the failures need to be eliminated as much as possible.

Since a power is supplied to a wire electrode, in wire-cut electric discharging, from two parts including an upper guide and a lower guide, a discharge generating position can be inferred based on a difference in supplied a current between the upper and lower wire guides. Thus, the technique is applied and an attempt is made as exemplified in WO2007/032114 (corresponding to US 2008/0110865 A1) in which a discharge generating position is obtained based on a difference in a current between the upper and lower wire guides by a first power supply and a magnitude of a current pulse to be supplied from a second power supply is adjusted based on the obtained discharge generating position, thereby positively controlling a machining shape. However, in the technique, an accuracy for detecting the discharge generating position is low enough to discriminate the upper, middle and lower parts of a thick workpiece of 50 mm or more in a practical viewpoint, so this technique is somewhat effective in controlling the straightness accuracy of thick punches but not so effective in detecting the discharge generating position at millimeter order accuracy. Thus, with the technique described in the document, the discharge generation at the edge cannot be accurately detected and thus the machining quality of the edge cannot be enhanced.

Generally, in the electric discharging, a clearance of several to several tens micrometers is present in the machining gap during the machining, a voltage of several tens to several hundreds volts is applied to the clearance, the insulation of the clearance is broken by the applied voltage so that pulse current for causing arc discharge is applied, and a high heat due to the arc discharge is utilized to remove the workpiece.

Therefore, even when a machining current pulse is supplied while the machining electrode and its opposite workpiece contact each other and are shorted, the arc discharge does not occur and a current simply flows, which is considered as less contributive to the machining. Thus, when a short-cut has occurred, various attempts has been carried out for the purpose of early elimination of the state of such short-circuit due to stoppage of flow of the pulse current or a concentration of sludge by specially applying a pulse current for scattering the sludge, as described in, for example, Japanese Patent Application Laid-Open No. 7-156019.

As described above, in a conventional electric discharging, after generation of discharge is confirmed by using a power supply for triggering discharge, a pulse current is applied to the machining gap.

SUMMARY OF THE INVENTION

It is an object of the present invention to provide, for solving the above conventional technical problems, an electric discharge machine capable of decreasing lowering of machining accuracy or machining failures of an edge of a workpiece.

An electric discharge machine according to the present invention is directed for intermittently applying a voltage to a machining gap formed between a machining electrode and a workpiece, thereby machining the workpiece, and includes a machining power supply for applying a voltage to the machining gap and detecting a contact between the machining electrode and its opposite workpiece. The machining power supply includes a first power supply circuit whose output voltage is equal to or less than an arc voltage, a second power supply circuit for supplying a pulse current to the machining gap, and a control unit which directs the second power supply to supply a pulse current to the machining gap while the machining electrode and the workpiece are in contact with each other when the contact between the machining electrode and its opposite workpiece is detected by the first power supply circuit.

The machining power supply may have a circuit for periodically inverting a polarity of the output voltage of the first power supply circuit.

The machining power supply may have a circuit for inverting the polarity of the output voltage of the first power supply circuit whenever a voltage starts being applied.

The machining power supply may have a circuit for selecting the application polarity of the output voltage of the first power supply circuit in constant cycles or whenever a voltage is applied such that an average voltage of the machining gap approaches zero.

The control unit may direct the second power supply circuit to supply a pulse current to the machining gap only when the machining electrode and its opposite workpiece are in contact with each other for a predetermined time or more while a voltage is being applied from the first power supply circuit to the machining gap.

The control unit may direct the second power supply circuit to supply a pulse current having a predetermined magnitude to the machining gap when the machining electrode and its opposite workpiece are in contact with each other for a predetermined time without being in an open state, after the first power supply circuit starts applying a voltage to the machining gap, and the control unit, on the other hand, may direct to supply a pulse current having a magnitude smaller than the predetermined magnitude when the machining electrode and its opposite workpiece are temporarily in an opened state and then brought into contact with each other, after the first power supply circuit starts applying a voltage to the machining gap.

The control unit may change a time that elapses after pulse current is supplied from the second power supply circuit until a voltage is then applied from the first power supply circuit to the machining gap, that is, an OFF time, depending on a magnitude of an output pulse current of the second power supply circuit.

The present invention, having the structure as described above, can provide electric discharge machines capable of decreasing lowering of machining accuracy or machining failures of an edge of a workpiece.

BRIEF DESCRIPTION OF THE DRAWINGS

The aforementioned and other objects and features of the present invention will be apparent from the following description of embodiments with reference to the accompanying drawings in which:

FIG. 9 is a diagram for explaining an example of machining gap voltage and current waveforms at the time the second power supply circuit is turned on;

DETAILED DESCRIPTION OF THE PREFERRED EMBODIMENTS

In an electric discharge machine according to one embodiment of the present invention, a power supply device includes a first power supply and a second power supply connected in parallel with the first power supply. The first power supply detects a contact in a machining gap between a machining electrode and a workpiece, and the second power supply supplies a large current pulse for machining to the machining gap. Thereby, a machining quality of an edge of a workpiece can be largely enhanced. The electric discharge machine according to the present invention includes a wire-cut electric discharge machine using a wire electrode as tool electrode and an electric discharge machine for die sinking using an electrode formed in a shape corresponding to the shape of an intended workpiece as tool electrode.

The electric discharge machine according to the present invention is characterized by the power supply device, and thus the power supply device will be mainly described, and constituents other than the power supply device in the electric discharge machine are similar to those in the conventional technique and thus an explanation thereof will be omitted.

Figure 1:
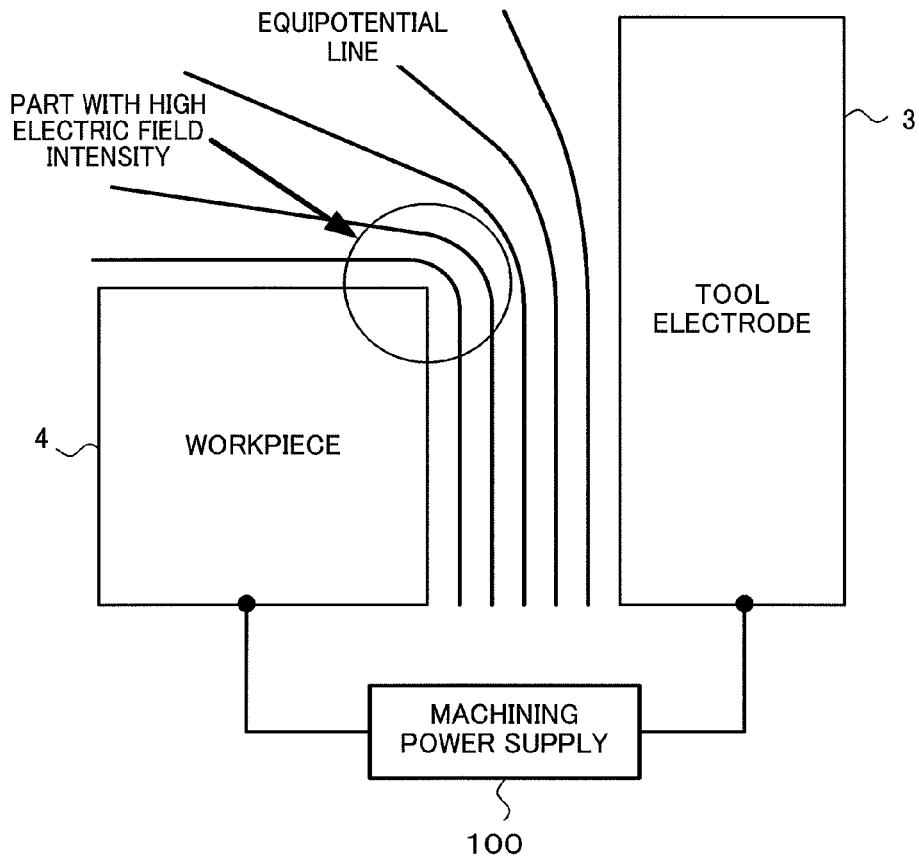
FIG. 1 is a diagram for explaining that an electric field intensity is high at an edge of a workpiece.
Figure 2:
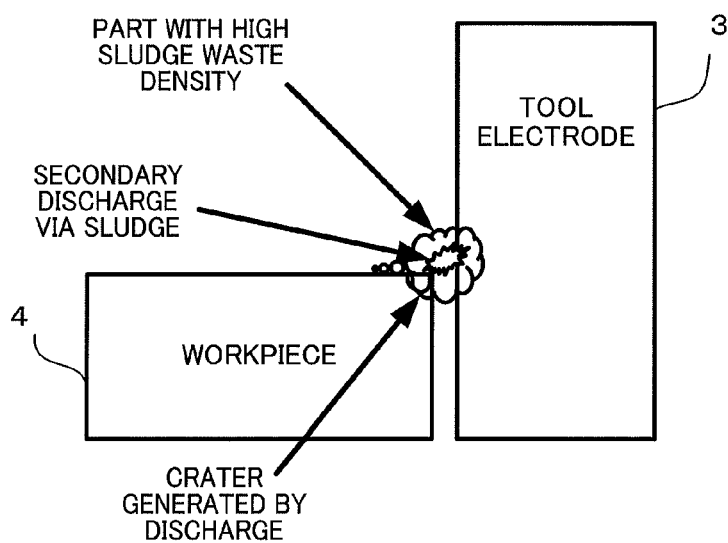
FIG. 2 is a diagram for explaining discharge on the top surface of the workpiece.
Figure 3:
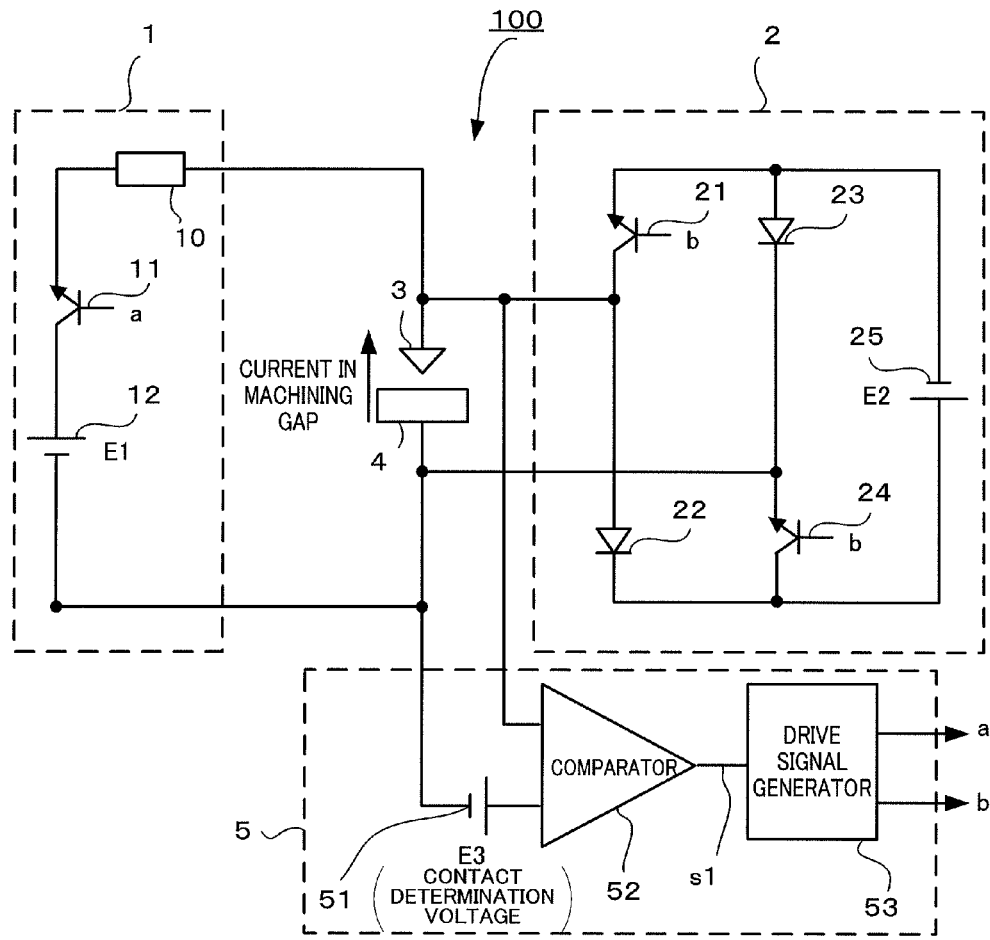
FIG. 3 is a diagram for explaining an example of machining power supply provided in an electric discharge machine according to one embodiment of the present invention (an example in which a unipolar voltage is applied)

FIG. 3 is a diagram for explaining an example of machining power supply provided in the electric discharge machine according to one embodiment of the present invention.

A machining power supply 100 includes a first power supply circuit 1 as first power supply, a second power supply circuit 2 as second power supply, and a control circuit 5. The first power supply circuit 1 and the second power supply circuit 2 are connected in parallel in a machining gap formed between a tool electrode 3 and a workpiece 4. The control circuit 5 sends drive signals to the first power supply circuit 1 and the second power supply circuit 2, and applies a voltage to the machining gap formed between the tool electrode 3 and the workpiece 4.

The first power supply circuit 1 is composed of a series circuit in which a current limiting device 10, a switching device 11 and a first power supply 12 are connected in series.

The current limiting device 10 is a resistor or inductance, for example. The first power supply circuit 1 applies a voltage to the machining gap formed between the tool electrode 3 and the workpiece 4 by the first power supply 12 whose internal impedance is high and whose output voltage is equal to or less than an arc voltage while an output current is being limited by the current limiting device 10 such as resistor or inductance.

The second power supply circuit 2 is configured such that a switching device 21 is connected in series to a first diode 22 for regeneration which regenerates residual energy in the circuit to the power supply after the switching device is turned off, a second diode 23 for regeneration is connected in series to a switching device 24 and these series circuits are connected in parallel to a second power supply 25. When the tool electrode 3 and the workpiece 4 contact each other, the second power supply circuit 2 having a low internal impedance supplies a large current pulse for machining.

The machining gap formed between the tool electrode 3 and the workpiece 4 is connected with a voltage measurement line from the control circuit 5 for detecting a voltage of the machining gap and turning on/off the switching devices 11, 21, 24. The control circuit 5 has a contact determination voltage source 51, a comparator 52 and a drive signal generator 53. The voltage of the machining gap formed between the tool electrode 3 and the workpiece 4 is compared with a contact determination voltage E3 of the contact determination voltage source 51 in the comparator 52.

Figure 4:
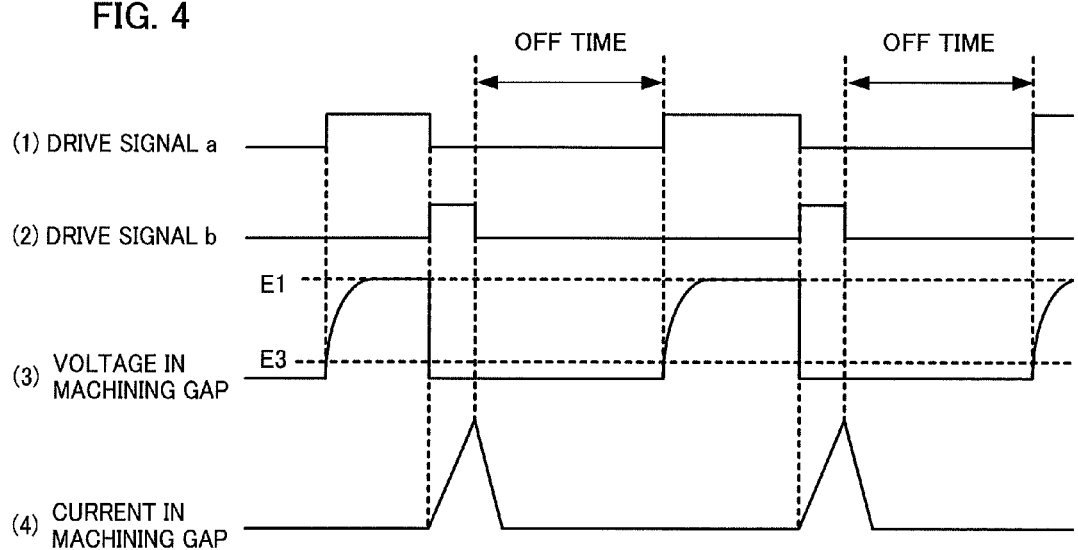
FIG. 4 is a time chart for explaining drive signals a, b output from a control circuit (drive signal generator) configuring the machining power supply of FIG. 3, and a machining current and a machining voltage.

The drive signal generator 53 outputs drive signals a, b based on a contact detection signal s1 output from the comparator 52. The drive signal a is input into a drive terminal of the switching device 11 and the drive signal b is input into drive terminals of the switching devices 21, 24. FIG. 4 shows examples of the drive signals a, b output from the drive signal generator 53 and illustrates a machining gap voltage and a machining gap current occurring in the machining gap formed between the tool electrode 3 and the workpiece 4.

In general, it may be considered that it would be ineffective to apply a pulse current for machining when the tool electrode contacts the workpiece. However, with an experiment in which a machining pulse is supplied only when the tool electrode contacts the workpiece, it is found that the machining is making progress and it cannot be assured that it is ineffective to supply the pulse current for machining when the tool electrode contacts the workpiece. This may be because in a so-called point contact state in which the tool electrode contacts the workpiece at a narrow area or in a slight contact state in which the tool electrode and the workpiece contact each other via sludge, the contact portion melts and scatters by supplying a large current pulse for machining to the machining gap and shift from the contact state to the arch discharge state is made. In the case of the wire-cut electric discharge machine, one reason may be that an electromagnetic repulsion force acts between the wire electrode and the workpiece by supplying a large current pulse to the machining gap, and a clearance occurs between the wire electrode and the workpiece due to the bent of wire electrode, with the result that shift from the state in which the wire electrode contacts the workpiece to the arc discharge state is made.

With the machining power supply shown in FIG. 3, since the contact between the tool electrode and the workpiece is only detected by the first power supply circuit 1 and arc discharge is not generated, discharge does not occur in the edge where an electric field intensity is high and discharge easily occurs, and thus machining failures such as a decrease in machining accuracy of the edge or cracks in the edge can be eliminated. The arc voltage varies strictly depending on a combination of a material nature of the tool electrode and a material nature of the workpiece or a machining condition such as discharge clearance length or arc current, and then arc voltage in conventional electric discharging is said to have 20 to 30 volt.

Seven examples of the drive signals a and b will be described with reference to FIGS. 4 to 11.

FIG. 4 is a time chart for explaining the drive signals a, b output from the control circuit 5 (the drive signal generator 53) configuring the machining power supply 100 of FIG. 3, and the voltage and current occurring in the machining gap. The machining power supply 100 shown in FIG. 3 applies a voltage to the machining gap formed between the tool electrode 3 and the workpiece 4 according to the drive signals a, b output from the drive signal generator 53 in the control circuit 5.

When the drive signal generator 53 of FIG. 3 outputs the drive signal a, the switching device 11 of the first power supply circuit 1 is turned on to apply a voltage E1 of the first power supply 12 as DC power supply to the machining gap. Thereby, the voltage of the machining gap increases up to the voltage E1 as shown in FIG. 4. Thereafter, when the machining electrode and its opposite workpiece contact each other and the voltage of the machining gap decreases to the contact determination voltage E3 or less, the contact detection signal s1 is output from the comparator 52 to the drive signal generator 53. The drive signal generator 53 receiving the contact detection signal s1 powers off the drive signal a and powers on the drive signal b for a first predetermined time. Thereby, the switching device 11 of the first power supply circuit 1 is turned off and application of voltage from the first power supply circuit 1 to the machining gap is stopped, and at the same time, the switching devices 21, 24 of the second power supply circuit 2 are turned on and the second power supply circuit 2 supplies a large current pulse for machining to the machining gap.

After the first predetermined time has elapsed, the drive signal b is also powered off and the second power supply circuit 2 stops supplying a current, and then the energy accumulated in a stray inductance of a discharge circuit is regenerated to the second power supply 25 of the second power supply circuit 2 via regeneration diodes 22, 23, and the current in the machining gap rapidly falls. When a second predetermined time has elapsed after the drive signal b was powered off, the drive signal a is powered on again and the above sequence is repeated.

A time that elapses after the drive signal b is powered off until the drive signal a in a next cycle is powered on, which is the aforementioned "second predetermined time", is called OFF time. The OFF time is a period in which dielectric recovery and cooling of the machining gap, and elimination of sludge produced due to discharge are carried out, playing an important role in the electric discharging.

The machining power supply of FIG. 3 detects the contact between the machining electrode and its opposite workpiece by a decrease in voltage of the machining gap. Alternatively, the machining power supply may detect output current of the first power supply 1 and determine the contact when the detected value exceeds a predetermined threshold.

In a case where pure water is used for a dielectric fluid, electrolytic erosion can occur when a voltage is applied by a unipolar power supply shown in FIG. 3 to the machining gap formed between the tool electrode 3 and the workpiece 4. The electrolytic erosion can be prevented by outputting a bipolar voltage from the first power supply circuit 1.

Figure 5:
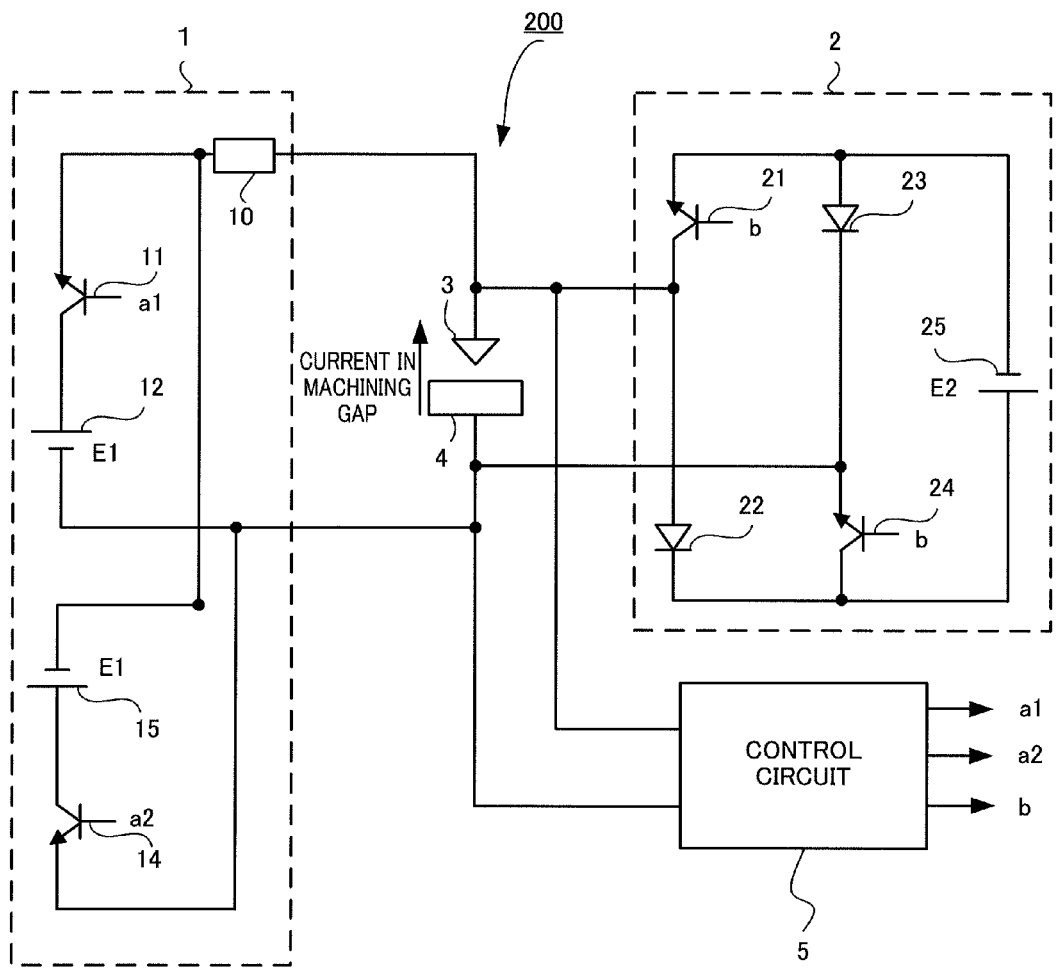
FIG. 5 is a diagram for explaining another example of machining power supply provided in the electric discharge machine according to one embodiment of the present invention (an example in which a bipolar voltage is applied)
Figure 6:
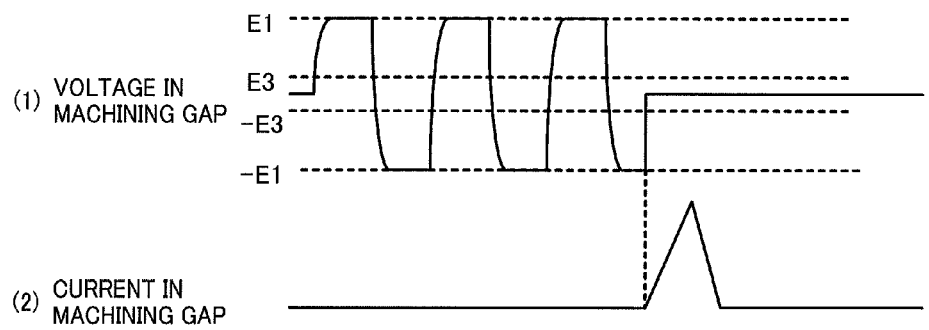
FIG. 6 is a diagram for explaining a first example of a method for switching a polarity of a voltage output from a first power supply circuit configuring the machining power supply of FIG. 5 (an example in which a polarity is inverted in constant cycles)
Figure 7:
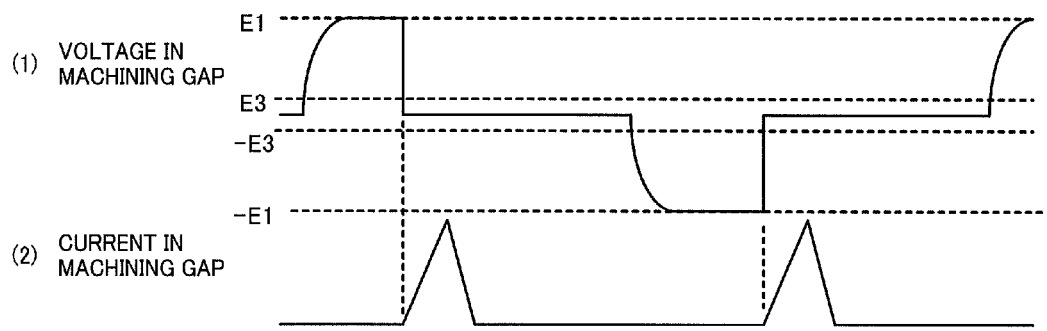
FIG. 7 is a diagram for explaining a second example of the method for switching the polarity of the voltage output from the first power supply circuit configuring the machining power supply of FIG. 5 (an example in which the polarity is inverted for every voltage application)

FIG. 5 is a diagram for explaining a machining power supply 200 capable of applying a bipolar voltage to the machining gap.

The machining power supply 200 of FIG. 5 will be described about the elements different from the machining power supply 100 of FIG. 3. A series circuit made of a third power supply 15 having a polarity different from that of the first power supply 12 and a switching device 14 is connected in parallel to a series connection made of the first power supply 12 and the switching device 11. A drive signal a1, a drive signal a2 and the drive signal b are output from the control circuit 5, the drive signal a1 is input into the drive terminal of the switching device 11 and the drive signal a2 is input into the drive terminal of the switching device 14.

Figure 8:
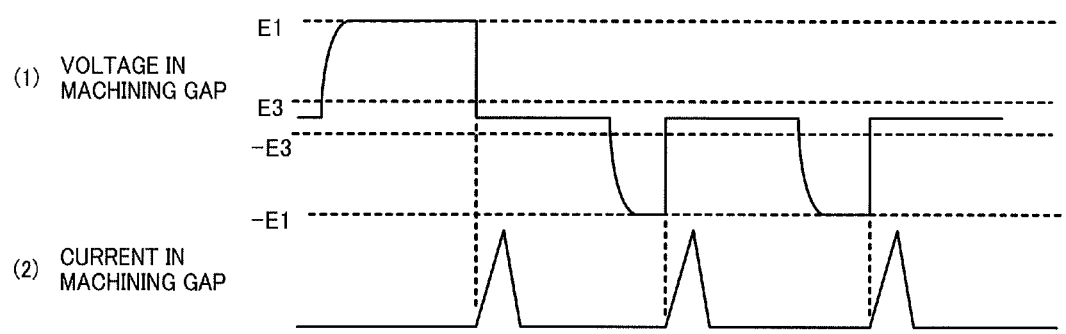
FIG. 8 is a diagram for explaining a third example of the method for switching the polarity of the voltage output from the first power supply circuit configuring the machining power supply of FIG. 5 (an example in which the polarity is inverted such that an average voltage is zero)
Figure 9:
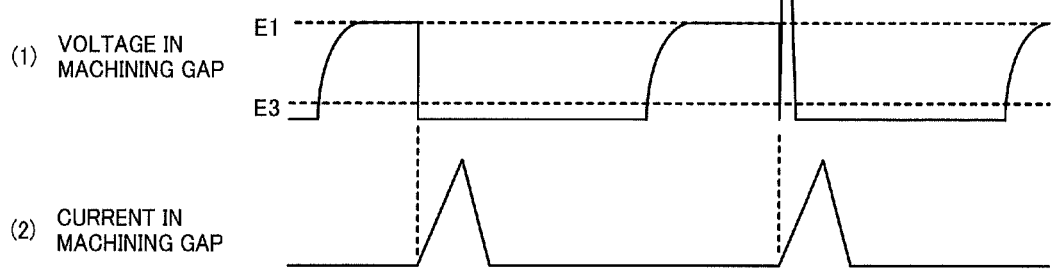

A method for switching the polarity of the voltage output from the first power supply circuit 1 in the machining power supply 200 of FIG. 5 includes:

a method for inverting the polarity in constant cycles (see FIG. 6), a method for inverting the polarity for every voltage application (see FIG. 7), and a method for selecting an application polarity at the timing such that an average voltage approaches zero (see FIG. 8). The switching devices 11, 14 are turned on/off by the drive signals a1, a2 output from the drive signal generator 53 in the control circuit 5 thereby to invert the polarity of the voltage to be applied from the first power supply circuit 1 to the machining gap formed between the tool electrode 3 and the workpiece 4.

As a result of the elaborate machining experiments, it is found that at the moment when the second power supply circuit 2 is turned on while the machining electrode and its opposite workpiece contact each other, a high voltage may be applied by the second power supply circuit 2 to the machining gap formed between the machining electrode and the workpiece (see FIG. 9), and discharge may occur via the sludge due to the high voltage so that secondary discharge occurs at the edge on the top surface of the workpiece 4.

The voltage of the second power supply circuit 2 needs to be increased to at least the arc voltage in order to supply a machining current pulse having a high peak to the machining gap, and cannot be reduced unlike the first power supply circuit 1.

Figure 10:
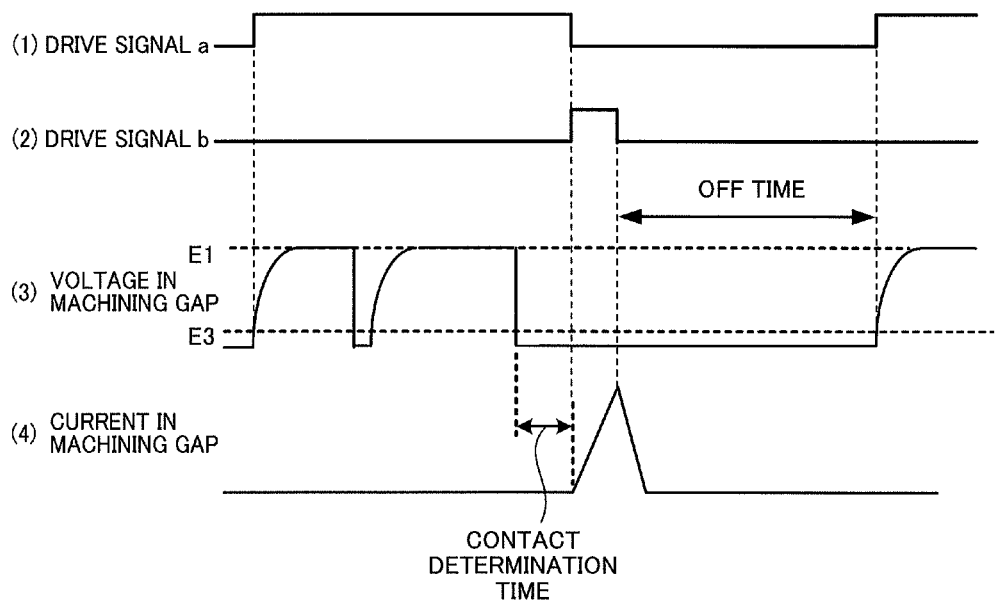
FIG. 10 is a diagram for explaining that the second power supply circuit is turned on only when the contact between the workpiece and the machining electrode continues for a predetermined time after a voltage starts being applied from the first power supply circuit to the machining gap, in the machining power supply of FIG. 3.

As shown in FIG. 10, the second power supply circuit 2 is not turned on until the contact between the machining electrode and its opposite workpiece continues for a predetermined time (predetermined contact determination time) after the first power supply circuit 1 starts applying a voltage to the machining gap. With the structure, since a high voltage is applied only when the tool electrode 3 and the workpiece 4 more tightly contact each other to an extent, a possibility of appearance of the high voltage in the machining gap at the moment when the voltage starts being applied can be reduced, thereby reducing the secondary discharge via the sludge. However, the number of times the second power supply circuit 2 is turned on is reduced and thus a decrease in machining speed is inevitable to an extent.

Figure 11:
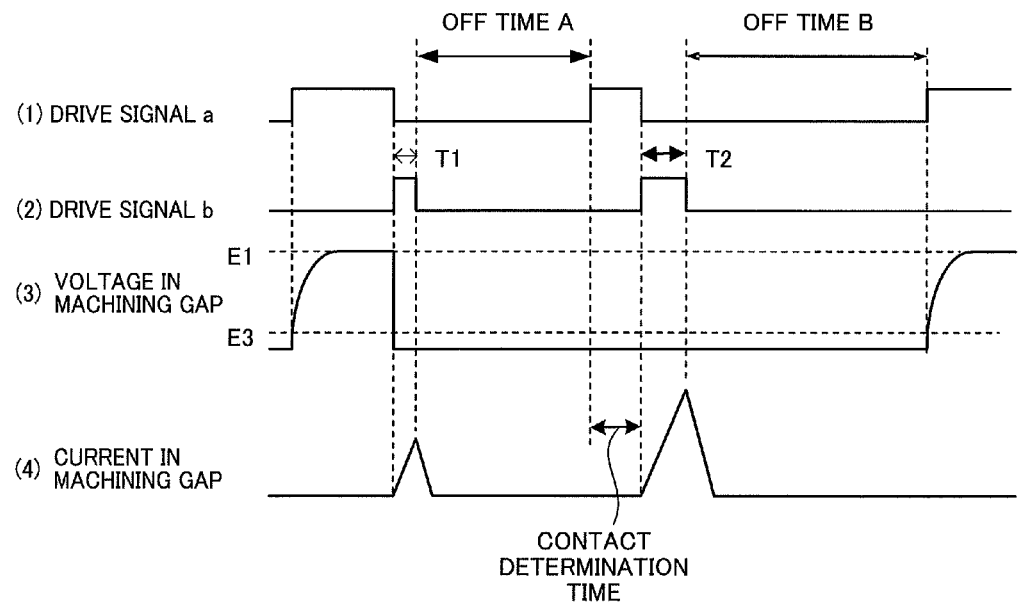
FIG. 11 is a diagram for explaining a case in which the drive signal b and OFF times having different lengths are used.

On the other hand, in case where a certain degree of decrease in machining quality due to rough machining is permitted, such as a case where shape correction is made by performing finishing after rough machining, the second power supply circuit 2 may be turned on in order to increase the machining speed even when the machining electrode and its opposite workpiece instantaneously contact each other. In this situation, as shown in FIG. 11, if a machining electrode and its opposite workpiece are temporarily opened at first and then brought into contact with each other after the first power supply circuit 1 starts applying a voltage, ON time of the second power supply circuit 2 is shortened (T1), while, if the machining electrode and its opposite workpiece are in contact from the start time and this contact is maintained for a predetermined time when the first power supply circuit 1 starts applying a voltage, ON time of the second power supply circuit 2 is prolonged (T2).

When the time T1 is prolonged, the machining speed increases but the machining quality of the edge tends to decrease. In other words, since the machining speed and the machining quality are in a trade-off relationship, the length of the time T1 is adjusted in the range of 0≤T1≤T2 according to the permitted degree of machining quality.

The amount of machining energy to be applied to the machining gap is determined depending on the length of the ON time of the second power supply, and the amount of sludge to be generated, time required for dielectric recovery in the machining gap and the damages of an electrode vary. Consequently, if the ON time is long, machining becomes stable when the OFF time is also prolonged, thereby preventing wire breakage in the case of the wire electric discharging. As a method for changing the magnitude of machining current, a plurality of power supplies having different power supply voltages (E2) may be prepared and the power supplies to be turned on may be selected from among the plurality of power supplies depending on the situation, instead of varying the ON time of the second power supply.

With the above solutions, the machining quality of the edge of a workpiece can be largely enhanced without remarkably reducing the machining speed.

The invention claimed is:

1. An electric discharge machine for intermittently applying a voltage to a machining gap formed between a machining electrode and a workpiece opposite the machining electrode and thereby machining the workpiece, the electric discharge machine comprising:

a machining power supply for applying a voltage to the machining gap and detecting a contact between the machining electrode and the opposite workpiece, the machining power supply including:
a first power supply circuit for detecting a contact between the machining electrode and the workpiece, the first power supply circuit having a first output voltage less than an arc voltage;
a second power supply circuit for machining the workpiece, the second power supply circuit having a second output voltage more than the arc voltage and configured for supplying a pulse current to the machining gap; and
a control unit which is operable to
determine that a contact exists between the machining electrode and the opposite workpiece when (i) the first power supply circuit supplies the first output voltage to the machining gap and (ii) the control unit detects that the voltage of the machining gap is equal to or less than a predetermined contact determination voltage, and
when the control unit determines that a contact exists between the machining electrode and the opposite workpiece, immediately supply a pulse current from the second power supply circuit to the machining gap while the machining electrode and the workpiece are in contact with each other.

2. The electric discharge machine according to claim 1, wherein the machining power supply has a circuit for periodically inverting a polarity of the first output voltage of the first power supply circuit.

3. The electric discharge machine according to claim 1, wherein the machining power supply has a circuit for inverting the polarity of the first output voltage of the first power supply circuit whenever a voltage starts being applied.

4. The electric discharge machine according to claim 1, wherein the machining power supply has a circuit for selecting the polarity of the first output voltage of the first power supply circuit in constant cycles or for every voltage application such that an average voltage of the machining gap approaches zero.

5. The electric discharge machine according to claim 1, wherein the electric discharge machine is a wire electric discharge machine, and the machining electrode is a wire electrode.

6. The electric discharge machine according to claim 1, wherein the electric discharge machine is an electric discharge machine for die sinking, and the machining electrode is an electrode for die sinking.

7. An electric discharge machine for intermittently applying a voltage to a machining gap formed between a machining electrode and a workpiece and thereby machining the workpiece, the electric discharge machine comprising:
   a machining power supply for applying a voltage to the machining gap and detecting a contact between the machining electrode and the opposite workpiece, the machining power supply including:
      a first power supply circuit having an output voltage equal to or less than an arc voltage;
      a second power supply circuit for supplying a pulse current to the machining gap; and
      a control unit which is operable, when the control unit detects a contact between the machining electrode and the opposite workpiece, to supply a pulse current from the second power supply circuit to the machining gap while the machining electrode and the workpiece are in contact with each other,
   wherein the control unit directs the second power supply to supply a pulse current having a predetermined magnitude to the machining gap when the machining electrode and the opposite workpiece are in contact with each other for a predetermined time without being in an open state, after the first power supply circuit starts applying a voltage to the machining gap, and
   the control unit, on the other hand, directs the second power supply to supply a pulse current having a magnitude smaller than the predetermined magnitude when the machining electrode and the opposite workpiece are temporarily in an opened state and then brought into contact with each other, after the first power supply circuit starts applying a voltage to the machining gap.

8. The electric discharge machine according to claim 7, wherein the control unit changes an OFF time that elapses after the pulse current is supplied from the second power supply circuit until a voltage is then applied from the first power supply circuit to the machining gap, depending on a magnitude of an output pulse current of the second power supply circuit.

9. A device, comprising:
   an electric discharge machine configured for intermittently applying a voltage to a machining gap formed between a machining electrode and a workpiece and for machining the workpiece, wherein the electric discharge machine includes:
      a machining power supply configured to apply a voltage to the machining gap and configured to detect a contact between the machining electrode and the opposite workpiece, the machining power supply including:
         a first power supply circuit configured to output a voltage that is equal to or less than an arc voltage;
         a second power supply circuit configured to supply a pulse current to the machining gap; and
         a control unit configured to, when the control unit detects a contact between the machining electrode and the opposite workpiece, supply a pulse current from the second power supply circuit to the machining gap while the machining electrode and the workpiece are in contact with each other,
      wherein the second power supply circuit is configured to output an output having a voltage that is at least that of the arc voltage.

10. A device, comprising:
    an electric discharge machine configured for intermittently applying a voltage to a machining gap formed between a machining electrode and a workpiece opposite the machining electrode and for machining the workpiece, wherein the electric discharge machine includes:
       a machining power supply configured to apply a voltage to the machining gap and configured to detect a contact between the machining electrode and the opposite workpiece, the machining power supply including:
          a first power supply circuit for detecting a contact between the machining electrode and the workpiece, the first power supply circuit configured to output a first output voltage that is less than an arc voltage;
          a second power supply circuit for machining the workpiece, the second power supply circuit configured to output a second output voltage more than the arc voltage and configured to supply a pulse current to the machining gap; and
          a control unit configured to
          determine that a contact exists between the machining electrode and the opposite workpiece when (i) the first power supply circuit supplies the first voltage to the machining gap and (ii) the control unit detects that the voltage of the machining gap is equal to or less than a predetermined contact determination voltage, and
          when the control unit determines that a contact exists between the machining electrode and the opposite workpiece, immediately supply a pulse current from the second power supply circuit to the machining gap while the machining electrode and the workpiece are in contact with each other.

11. The device according to claim 10, wherein the machining power supply has a circuit configured to periodically invert a polarity of the first output voltage of the first power supply circuit.

12. The device according to claim 10, wherein the machining power supply has a circuit configured to invert the polarity of the first output voltage of the first power supply circuit whenever a voltage starts being applied.

13. The device according to claim 10, wherein the machining power supply has a circuit configured to select the polarity of the first output voltage of the first power supply circuit in constant cycles or for every voltage application such that an average voltage of the machining gap approaches zero.

14. The device according to claim 10, wherein the electric discharge machine is a wire electric discharge machine and the machining electrode is a wire electrode.

15. The device according to claim 10, wherein the electric discharge machine is an electric discharge machine for die sinking and the machining electrode is an electrode for die sinking.

16. A device, comprising:
an electric discharge machine configured for intermittently applying a voltage to a machining gap formed between a machining electrode and a workpiece and for machining the workpiece, wherein the electric discharge machine includes:
- a machining power supply configured to apply a voltage to the machining gap and configured to detect a contact between the machining electrode and the opposite workpiece, the machining power supply including:
  - a first power supply circuit configured to output a voltage that is equal to or less than an arc voltage;
  - a second power supply circuit configured to supply a pulse current to the machining gap; and
  - a control unit configured to, when the control unit detects a contact between the machining electrode and the opposite workpiece, supply a pulse current from the second power supply circuit to the machining gap while the machining electrode and the workpiece are in contact with each other,
- wherein the control unit directs the second power supply to supply a pulse current having a predetermined magnitude to the machining gap when the machining electrode and the opposite workpiece are in contact with each other for a predetermined time without being in an open state, after the first power supply circuit starts applying a voltage to the machining gap, and
- the control unit, on the other hand, directs the second power supply to supply a pulse current having a magnitude smaller than the predetermined magnitude when the machining electrode and the opposite workpiece are temporarily in an opened state and then brought into contact with each other, after the first power supply circuit starts applying a voltage to the machining gap.

17. The device according to claim 16, wherein the control unit changes an OFF time that elapses after the pulse current is supplied from the second power supply circuit until a voltage is then applied from the first power supply circuit to the machining gap, depending on a magnitude of an output pulse current of the second power supply circuit.

18. An electric discharge machine for intermittently applying a voltage to a machining gap formed between a machining electrode and a workpiece and thereby machining the workpiece, the electric discharge machine comprising:
- a machining power supply for applying a voltage to the machining gap and detecting a contact between the machining electrode and the opposite workpiece, the machining power supply including:
  - a first power supply circuit having an output voltage equal to or less than an arc voltage;
  - a second power supply circuit for supplying a pulse current to the machining gap; and
  - a control unit which is operable, when the control unit detects a contact between the machining electrode and the opposite workpiece, to supply a pulse current from the second power supply circuit to the machining gap while the machining electrode and the workpiece are in contact with each other,
- wherein the second power supply circuit is configured to output an output having a voltage that is at least that of the arc voltage.

* * * * *